United States Patent [19]

Zander

[11] Patent Number: 5,430,517
[45] Date of Patent: Jul. 4, 1995

[54] CAMERA VIEWFINDER WITH MASKING DEVICE FOR VARYING THE VIEWING FIELD

[75] Inventor: Dennis R. Zander, Penfield, N.Y.

[73] Assignee: Eastman Kodak Company, Rochester, N.Y.

[21] Appl. No.: 253,042

[22] Filed: Jun. 2, 1994

[51] Int. Cl.6 .............................................. G03B 13/10
[52] U.S. Cl. .................................................... 354/222
[58] Field of Search ................... 354/219, 222, 159, 94

[56] References Cited

U.S. PATENT DOCUMENTS

| | | | |
|---|---|---|---|
| 3,890,626 | 6/1975 | Ettischer | 354/197 |
| 3,903,537 | 9/1975 | Ettischer | 354/197 |
| 3,961,344 | 6/1976 | Baisch et al. | 354/219 |
| 4,041,508 | 8/1977 | Edamoto et al. | 354/128 |
| 4,583,831 | 4/1986 | Harvey | 354/106 |
| 4,697,901 | 10/1987 | Wakabayashi et al. | 354/221 |
| 4,931,818 | 6/1990 | Gates | 354/222 |
| 4,973,997 | 11/1990 | Harvey | 354/106 |
| 5,021,815 | 6/1991 | Harvey | 354/222 |
| 5,059,993 | 10/1991 | Harvey | 354/222 |
| 5,059,994 | 10/1991 | Harvey | 354/222 |
| 5,086,311 | 2/1992 | Naka et al. | 354/195.1 |
| 5,343,265 | 8/1994 | Oi et al. | 354/222 |

FOREIGN PATENT DOCUMENTS

| | | | |
|---|---|---|---|
| 4113571 | 10/1991 | Germany | G03B 13/10 |
| 404007535 | 1/1992 | Japan | G03B 13/02 |

*Primary Examiner*—M. L. Gellner
*Assistant Examiner*—Nicholas J. Tuccillo
*Attorney, Agent, or Firm*—Roger A. Fields

[57] ABSTRACT

A camera viewfinder comprises a viewfinder window defining a viewing field, and a masking device movable to position respective mask openings having different aspect ratios over the viewfinder window to vary the viewing field. The masking device includes a pair of separate independent masks, each of which has one of the mask openings and is movable relative to the other over the viewfinder window from respective locations at opposite sides of the viewfinder window.

4 Claims, 2 Drawing Sheets

CAMERA VIEWFINDER WITH MASKING DEVICE FOR VARYING THE VIEWING FIELD

FIELD OF THE INVENTION

The invention relates generally to the field of photographic cameras, and in particular to a camera viewfinder with a masking device for varying the viewing field.

BACKGROUND OF THE INVENTION

When taking a picture it is necessary to know not only in what direction to aim the camera but also how much of the subject will be included in the picture. For this reason practically every camera has a viewfinder of some kind.

Cameras have been proposed, such as disclosed in prior art U.S. Pat. Nos. 5,086,311, issued February 1992, 4,583,831, issued Apr. 22, 1986, and 3,490,844, issued Jan. 20, 1970, that include means for taking pictures which when printed are intended to have different aspect ratios. Each aspect ratio is selected by the photographer before he or she takes the picture. One currently popular aspect ratio in addition to the normal or full frame one, i.e. 1.5:1, in 35 mm photography is between 2:1 and 3:1. An aspect ratio between 2:1 and 3:1 provides a panoramic or stretch format print as compared to the normal format print having an aspect ratio of 1.5:1.

Since it is necessary for the photographer to know how much of the subject will be included in the picture, the viewfinder in these cameras typically will have some masking device or the like for partially masking the viewfinder field to match the aspect ratio selected by the photographer. For example, prior art U.S. Pat. No. 4,973,997, issued Nov. 27, 1990, discloses a masking blade movable to alternatively position a pair of mask openings having panoramic and telephoto aspect ratios, respectively, over a viewfinder window to vary the viewing field. A problem, however, with this design is that the masking blade must move within an area inside the camera body that is at least four times the area occupied by the viewing window. Thus, the size of the camera body may need to be enlarged to accommodate movement of the masking blade.

SUMMARY OF THE INVENTION

According to the invention a camera viewfinder comprising a viewfinder window defining a viewing field, and masking means movable to position respective mask openings having different aspect ratios over the viewfinder window to vary the viewing field, is characterized in that:

the masking means includes a pair of separate independent masks, each of which has one of the mask openings and is movable relative to the other over the viewfinder window from respective locations at opposite sides of the viewfinder window.

With this design, the masking means will move within an area inside the camera body that is only three times the area occupied by the viewing window (as compared to movement within an area that is four times the area occupied by the viewing window in the case of the masking blade disclosed in prior art U.S. Pat. No. 4,973,997). Thus, the size of the camera body need not be enlarged as much as in the prior art example.

DETAILED DESCRIPTION OF THE INVENTION

The invention is disclosed as being embodied preferably in a camera viewfinder. Because the features of a camera viewfinder are generally known, the description which follows is directed in particular only to those elements forming part of or cooperating directly with the disclosed embodiment. It is to be understood, however, that other elements may take various forms known to a person of ordinary skill in the art.

Figure 1:
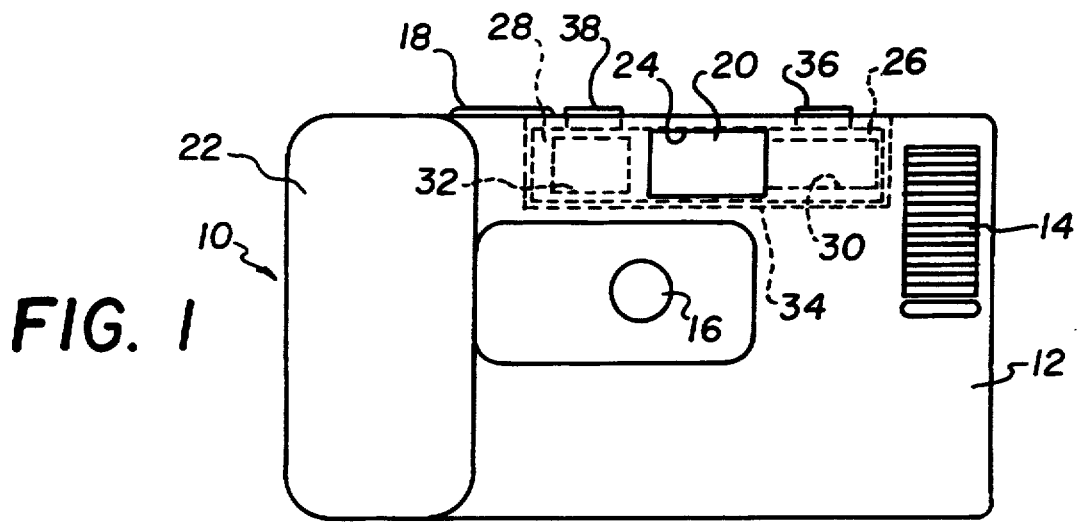
FIG. 1 is a front elevation view of a camera viewfinder with a masking device for varying the viewing field, showing the masking device in a non-masking position.

Referring now to the drawings, FIG. 1 shows a 35 mm camera 10 including a camera body 12, a flash emission window 14, a picture-taking lens 16, a shutter release button, 18, a viewfinder 20, and a battery-containing hand grip 22.

Figure 2:
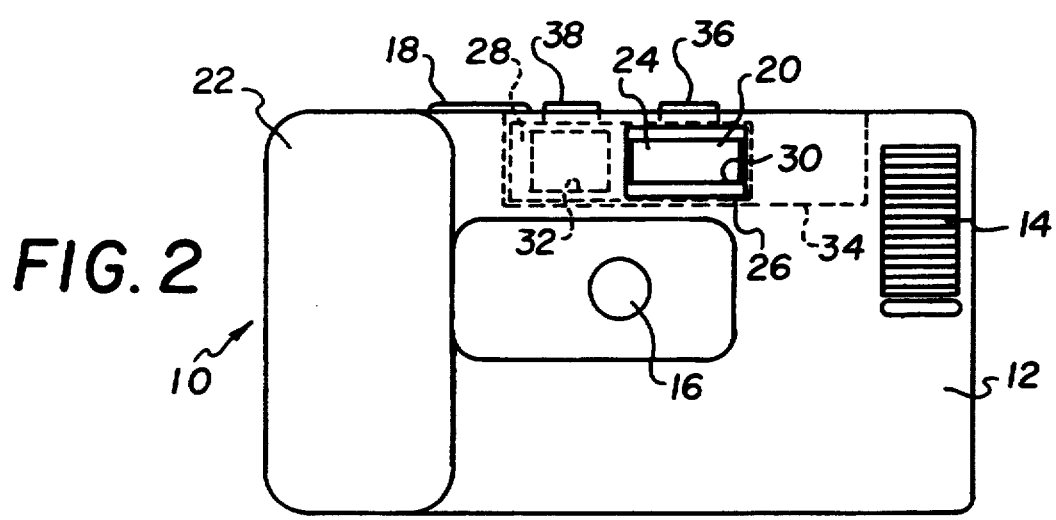
FIG. 2 is a front elevation view similar to FIG. 1, showing the masking device in a first masking position.
Figure 3:
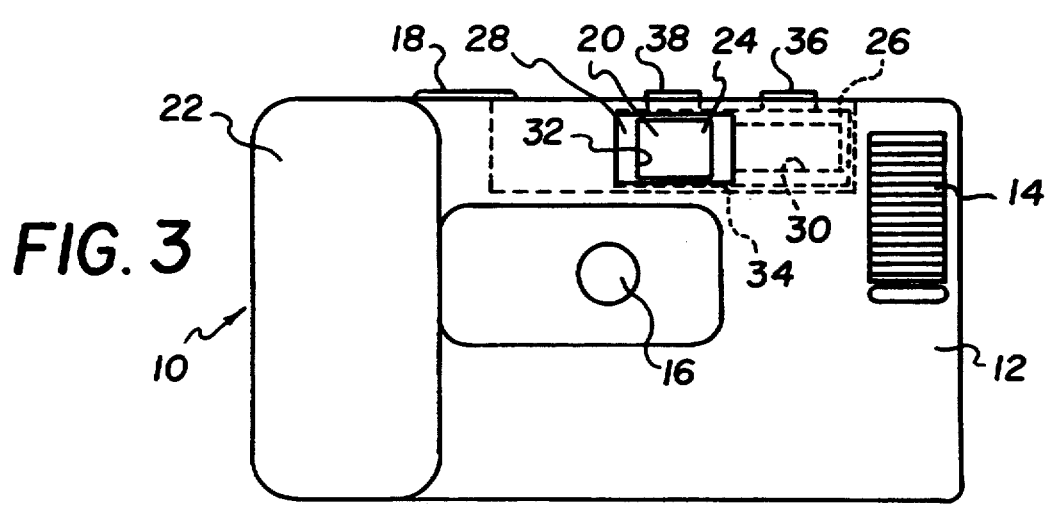
FIG. 3 is a front elevation view similar to FIG. 1, showing the masking device in a second (alternative) masking position.

The camera viewfinder 20 as is known includes a front viewfinder window 24 which together with a rear viewfinder window, not shown, define a viewing field having an HDTV (high density television) aspect ratio, e.g. 1.8:1. A pair of separate independent masking blades 26 and 28 have respective mask openings 30 and 32 with different aspect ratios, and are positioned at opposite sides of the front viewfinder window 24 as shown in FIG. 1 when it is not desired to change the HDTV aspect ratio of the viewing field. The mask opening 30 has a panoramic aspect ratio, e.g. 2.8:1. The mask opening 32 has a normal or full frame aspect ratio, e.g. 1.5:1. The masking blades 26 and 28 are supported in a channel 34 for relative movement in the same plane towards and away from each other to allow the mask opening 30 or 32 of only one of them at a time to be positioned over the front viewfinder window 24 when it is desired to vary the viewing field. FIG. 2 shows the masking blade 26 moved to the left as compared to FIG. 1 to position its mask opening 30 over the front viewfinder window 24. In this instance, the viewing field has a panoramic aspect ratio. FIG. 3 shows the masking blade 28 moved to the right as compared to FIG. 1 to position its mask opening 32 over the front viewfinder window 24. In this instance, the viewing field has a normal aspect ratio.

Figure 4:
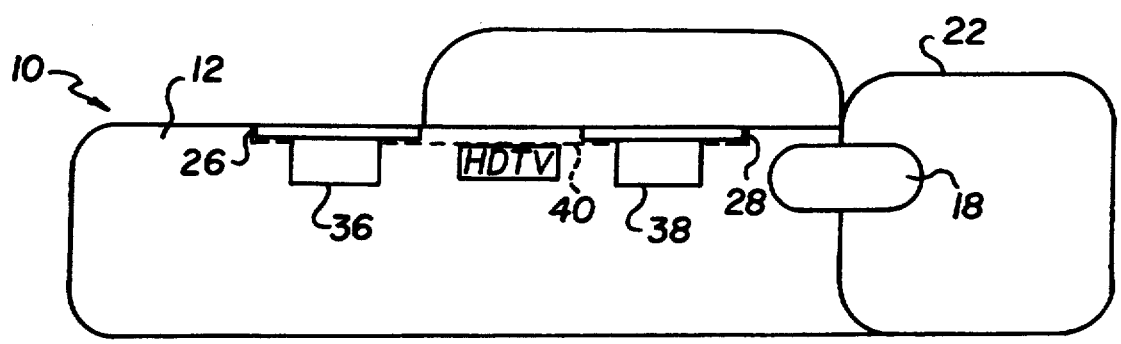
FIG. 4 is a top plan view of the masking device as shown in FIG. 1.
Figure 5:
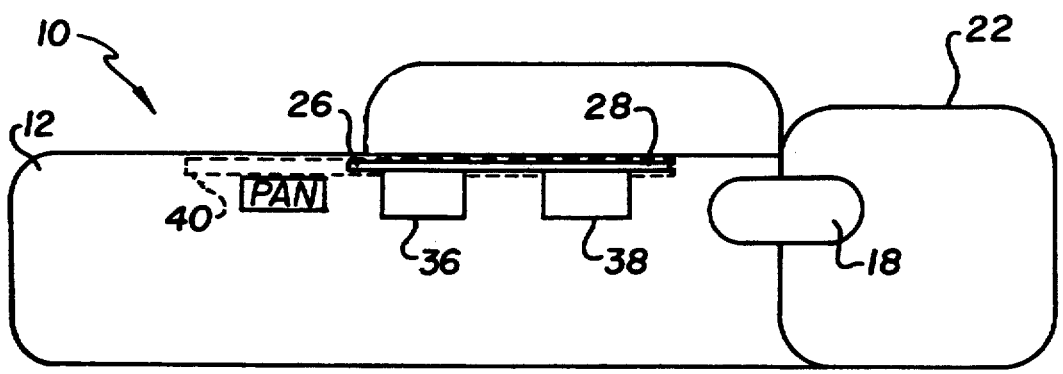
FIG. 5 is a top plan view of the masking device as shown in FIG. 2.
Figure 6:
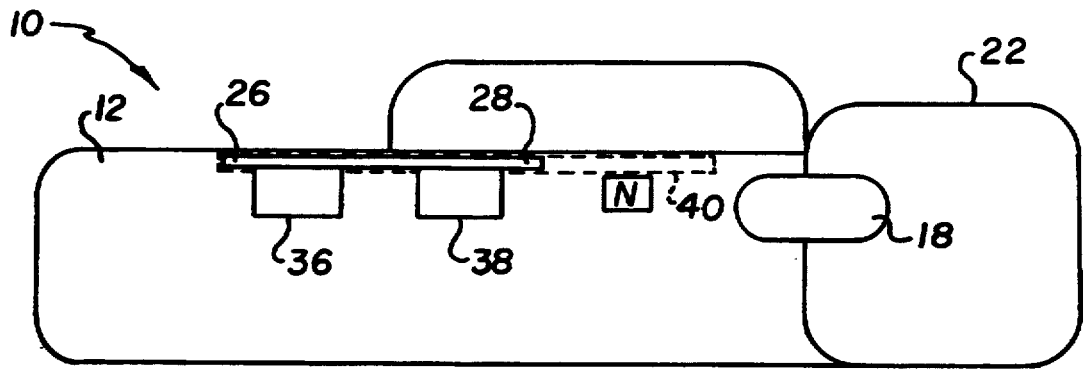
FIG. 6 is a top plan view of the masking device as shown in FIG. 3.

As shown in FIGS. 4–6, the top of the camera body 12 includes the printed indicia "HDTV", "PAN", and "N" (normal). The masking blade 26 has an integral tab 36 that uncovers the indicia "PAN" and covers the indicia "HDTV" when the blade is moved to position its masking opening 30 over the front viewfinder window 24. See FIGS. 4 and 5. The masking blade 28 has an integral tab 38 that uncovers the indicia "N" and covers the indicia "HDTV" when the blade is moved to position its masking opening 32 over the front viewfinder window 24. See FIGS. 4 and 5. A light-trapping slot 40 is cut in the top of the camera body 12 to permit movement of the tabs 36 and 38.

The invention has been described with reference to a preferred embodiment. However, it will be appreciated that variations and modifications can be effected by a person of ordinary skill in the art without departing from the scope of the invention.

PARTS LIST 10. 35 mm camera
12. camera body
14. flash emission window
16. picture-taking lens
18. shutter release button
20. viewfinder
22. battery-containing hand grip
24. front viewfinder window
26. masking blade
28. masking blade
30. mask opening
32. mask opening
34. channel
36. tab
38. tab
40. slot

I claim:

1. A camera viewfinder comprising a viewfinder window defining a viewing field, and masking means movable to position respective mask openings having different aspect ratios over said viewfinder window to vary the viewing field, is characterized in that:

said masking means includes a pair of separate independent masking blades, each of which has one of said mask openings and is movable relative to the other over said viewfinder window from respective locations at opposite sides of the viewfinder window.

2. A camera viewfinder as recited in claim 1, wherein said pair of separate independent masking blades are arranged in the same plane to allow the mask opening of only one of them at a time to be positioned over said viewfinder window.

3. A camera viewfinder as recited in claim 1, wherein said camera viewfinder includes various indicia corresponding to the aspect ratios of said masking openings, and said pair of separate independent masking blades include respective means for uncovering whichever one of said indicia corresponds to the aspect ratio of a masking opening positioned over said viewfinder window.

4. A camera viewfinder comprising a viewfinder window defining a viewing field, and masking means movable to position respective mask openings having different aspect ratios over said viewfinder window to vary the viewing field, is characterized in that:

said masking means includes a pair of separate independent masks, each of which has one of said mask openings and is movable relative to the other over said viewfinder window from respective locations at opposite sides of the viewfinder window;

said camera Viewfinder includes various indicia corresponding to the aspect ratios of said masking openings; and said pair of separate independent masks include respective means for uncovering whichever one of said indicia corresponds to the aspect ratio of a masking opening positioned over said viewfinder window.

* * * * *